Nov. 14, 1967   H. CHARNOCK   3,352,657
METHOD OF ATTENUATING A RIBBON OF GLASS ON A MOLTEN METAL BATH
Filed March 30, 1964
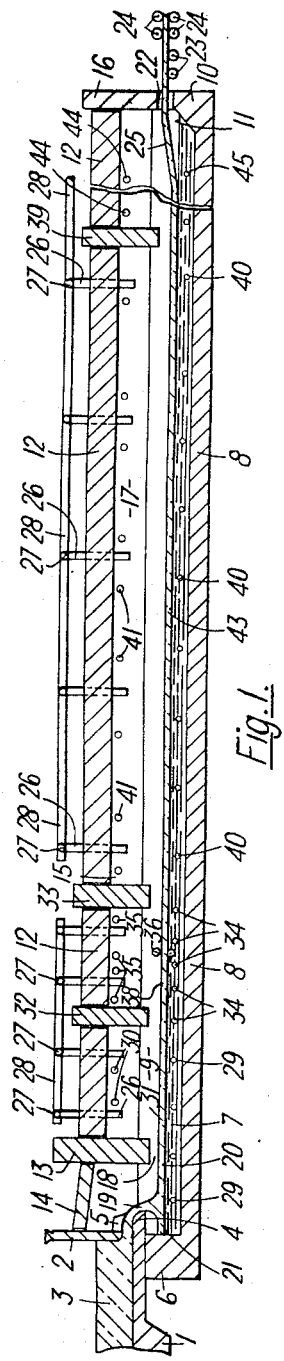
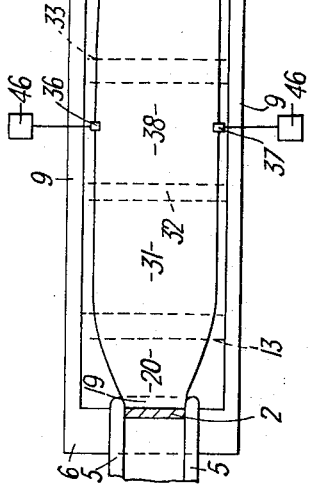
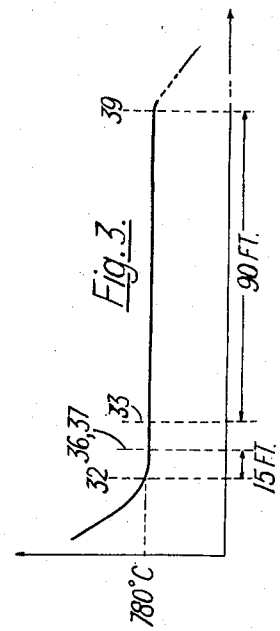
Harold Charnock
Inventor
By Morrison, Kennedy & Campbell
Attorneys

United States Patent Office 3,352,657
Patented Nov. 14, 1967

3,352,657
METHOD OF ATTENUATING A RIBBON OF GLASS ON A MOLTEN METAL BATH
Harold Charnock, Upholland, near Wigan, England, assignor to Pilkington Brothers Limited, Liverpool, England, a corporation of Great Britain
Filed Mar. 30, 1964, Ser. No. 355,760
Claims priority, application Great Britain, Apr. 2, 1963, 13,063/63
5 Claims. (Cl. 65—65)

This invention relates to the manufacture of flat glass, and in particular to a method of and apparatus for manufacturing flat glass during which glass in ribbon form is advanced along a bath of molten metal.

In the manufacture of flat glass in ribbon form during which glass in ribbon form is advanced along a bath of molten metal, the bath is so constituted as to have all the characteristics fully described in U.S.A. Patent No. 3,083,551, glass being delivered to the bath at a controlled rate and the ribbon of glass produced being discharged from the bath to an annealing lehr.

It is a main object of the present invention to provide an improved method of and apparatus for manufacturing flat glass in ribbon form of various commercial thicknesses on a bath of molten metal.

Accordingly the invention provides in a method of producing flat glass during which glass in ribbon form is advanced along a bath of molten metal, the steps of engaging the glass in ribbon form on the bath to regulate the rate of advance of the ribbon along the bath, while the viscosity of the glass is in a range of viscosities in which the ribbon can be attenuated, and maintaining the viscosity of the ribbon in said range of viscosities over a sufficient length of the ribbon to ensure that the ribbon is progressively attenuated during its travel on the bath to a desired thickness by applying a tractive effort to the ribbon.

Further the invention provides in a method of producing flat glass during which glass is advanced in ribbon form along a bath of molten metal, the steps of engaging the glass in ribbon form on the bath, to regulate the rate of advance of the ribbon along the bath, while the viscosity of the glass is in a range of viscosities in which the ribbon can be attenuated, and maintaining the ribbon as it is advanced at a substantially constant viscosity in said range of viscosities, over a sufficient length of the ribbon to ensure that the ribbon is progressively attenuated during its travel on the bath to a desired thickness by applying a tractive effort to the ribbon.

In a preferred method according to the invention the glass in ribbon form is engaged marginally to regulate the rate of advance of the ribbon.

From another aspect the invention provides in a method of producing flat glass during which glass is advanced in ribbon form along a bath of molten metal, the steps of delivering glass at a controlled rate to the bath of molten metal and advancing the glass along the bath under thermal conditions which assure that a layer of molten glass is established on the bath, maintaining said glass layer in molten condition until there is developed on the surface of the bath a buoyant body of molten glass by permitting said layer of molten glass to flow laterally unhindered to the limit of its free flow, gradually cooling the molten glass as it is advanced in ribbon form to a viscosity in a range of viscosities in which the ribbon can be attenuated, engaging the advancing ribbon of glass marginally while at said viscosity to regulate the rate of advance of the ribbon downstream of the bath in relation to said controlled rate of delivery of glass to the bath, and maintaining the ribbon as it is advanced at a substantially constant viscosity in said range of viscosities over a sufficient length of the ribbon to ensure that the ribbon is progressively attenuated during its travel on the bath to a desired thickness by applying a tractive effort to the ribbon.

The glass may be delivered to the bath as a formed ribbon of glass of a definite thickness. Alternatively molten glass is poured on to the bath at a controlled rate to establish said layer of molten glass on the bath.

Before the ribbon of glass is engaged it is subjected to thermal conditions which ensure that the viscosity of the glass is in the range of $10^5$ to $10^8$ poises and desirably the ribbon is maintained as it is advanced at a substantially constant viscosity in that range.

Further the invention comprehends engaging the ribbon marginally when the ribbon has advanced along the bath for a distance at said substantially constant viscosity, which distance is such that the part of the ribbon at said viscosity upstream of the edge rolls constitutes a barrier to resist the transmission of tractive effort.

The invention also comprehends apparatus for manufacturing flat glass in ribbon form of desired thickness comprising in combination, a tank structure containing a bath of molten metal and having an inlet for glass to the bath and an outlet from the bath, means for advancing glass in ribbon form along the bath towards said outlet, temperature regulators associated with the bath for ensuring that the viscosity of the glass as it is advanced in ribbon form is in a range of viscosities in which the ribbon can be attenuated, means located with respect to the tank structure and arranged to engage the viscous glass to regulate the rate of advance of the ribbon along the bath, and temperature regulators associated with a sufficient length of the bath for maintaining the glass as it is advanced at a substantially constant viscosity in that range to ensure that the ribbon is progressively attenuated during its travel on the bath to a desired thickness by a tractive effort applied to the ribbon by means located with respect to the tank structure downstream of said means for engaging the viscous glass.

In a preferred embodiment apparatus according to the invention comprises a roof structure over the tank structure and defining a headspace over the bath, temperature regulators associated with a first zone of the bath defined by a pair of partitions extending across the headspace, which temperature regulators ensure that a layer of molten glass is established on the bath and maintained said glass in molten condition as it is advanced to develop a buoyant body of molten glass by permitting the glass in said layer to flow laterally unhindered to the limit of its free flow as said buoyant body is advanced in ribbon form along the bath to a second zone of the bath defined by a successive pair of partition in the headspace, temperature regulators associated with said second zone of the bath to cool the glass to a viscosity in said range of viscosities in which the ribbon can be attenuated, means located in said second zone of the bath to engage the ribbon and to control its rate of advance along the bath to a third zone of the bath defined by a further successive pair of partitions in the headspace, and temperature regulators associated with the third zone to ensure that the ribbon is maintained at a substantially constant viscosity, in said range of viscosities as the ribbon is advanced through the third zone, the distance from said engaging means to the downstream end of the third zone being sufficient to ensure that the ribbon is attenuated to the desired thickness by the applied tractive effort.

Preferably the engaging means comprises two pairs of edge rolls, which pairs are respectively mounted at oppositely disposed locations in the tank structure, and are arranged to grip the marginal areas of the viscous ribbon, said edge rolls being spaced downstream from the beginning of the second zone of the bath by a distance which is such that the part of the viscous ribbon upstream of the edge rolls constitutes a barrier to resist the transmission of tractive effort and means regulating the angular velocity of the edge rolls thereby to regulate the rate of advance of the ribbon.

The invention also comprehends flat glass of desired thickness produced by a method as set out above and a sheet of glass cut therefrom.

In order that the invention may be more clearly understood a preferred embodiment thereof will now be described, by way of example, with reference to the accompanying diagrammatic drawings.

FIGURE 1 is a sectional elevation of apparatus according to the invention for manufacturing flat glass in ribbon form, the apparatus including a tank structure holding a bath of molten metal and means for delivering molten glass to the bath at a controlled rate and for discharging the glass from the bath in desired ribbon form, FIGURE 2 is a plan view of the tank structure holding the bath of molten metal of FIGURE 1, and FIGURE 3 is a graph showing one example of the longitudinal temperature distribution down the bath when operating a method according to the invention.

In the drawings the same reference numerals designate the same parts.

Referring to the apparatus shown in FIGURES 1 and 2, a forehearth of a continuous glass melting furnace is indicated at 1 and a regulating tweel at 2. Molten glass 3 flows from the melting furnace over the forehearth 1 to a spout which comprises a lip 4 and side jambs 5, one of which is indicated in FIGURE 1. The lip 4 and side jambs 5 form a spout of generally rectangular cross-section.

The spout lip 4 overlaps an end wall 6 of a tank structure containing a bath 7 of molten metal having the characteristics of the molten metal bath described in U.S.A. Patent 3,083,551 and which is preferably a bath of molten tin or an alloy of tin. The tank structure further comprises a floor 8, side walls 9 and an end wall 10 at the outlet end of the bath. The floor 8, side walls 9 and end walls 6 and 10 form an integral structure. The level of the surface of the bath of molten tin 7 is indicated at 11 and the configuration of the tank structure, as illustrated in FIGURE 2, is such that the distance between the side walls 9, 9 is greater than the width of the glass on the bath.

The tank structure supports a roof structure including a roof 12, a vertically adjustable end wall 13 at the inlet end of the bath, a roof section 14 over the spout 4, 5, side walls 15, and a vertically adjustable end wall 16 at the outlet end of the bath. The roof structure thus provides a tunnel over the bath 7 and defines a headspace 17 over the bath.

The adjustable end wall 13 at the inlet end of the bath is set to define an inlet 18, which is restricted in height, for molten glass 19 flowing from the spout lip 4 on to the bath to establish a layer of molten glass on the bath as indicated at 20.

The vertical spacing of the lip 4 of the spout from the surface 11 of the bath is of the order of a few inches and is such as to ensure a heel 21 of molten glass being formed behind the glass flowing down the spout to the bath, which heel extends rearwardly under the spout lip 4 to the end wall 6. The free fall ensures that whereas the glass which has formed the upper surface of the glass on the spout continually flows forward into the upper surface of the layer 20, the glass which has formed the under surface of the glass on the spout flows rearwardly and a bottom surface is generated for the glass layer advancing along the bath, in which bottom surface distortion derived from physical contact of molten glass with the spout and the forehearth is minimal.

The outlet end walls 10 and 16 of the tank structure and roof structure together define an outlet 22, which is restricted in height, from the bath, and outside the discharge end of the tank conveying rollers 23 are so mounted as to be exposed above the level of the outlet 22. Pairs of driven rollers 24 follow the conveying rollers 23 and these driven rollers 24 apply tractive effort to the stabilised ribbon of glass 25 which is discharged from the bath through the outlet 22.

As will be described below the ribbon of glass 25 which is discharged from the bath is sufficiently stiffened to permit it to be taken unharmed from a molten bath and this ribbon has a lustre equivalent to that known as "fire finish" and is free from distortion. The ribbon 25 passes from the rollers 23 and 24 into a conventional lehr, not shown, through which lehr the glass travels and is annealed before emerging for cutting into large sheets as is well understood in the art.

The roof structure 12 is at intervals provided with ducting 26 connected by branches 27 to the headers 28 through which a protecting gas is fed into the headspace 17 to create a plenum of protective atmosphere in the headspace, which is substantially closed. The protecting gas is a gas which will not react chemically with the metal of the bath 7 to produce glass contaminants and thereby protects the bath surface at the sides of the ribbon of glass and under the stiffened ribbon 25 as it is discharged from the bath. The creation of the plenum of atmosphere in the headspace also minimises ingress of external atmosphere into the headspace through the inlet 18 and the outlet 22.

Molten glass 19 falls over the spout lip 4 at a rate controlled by the vertical position of the regulating tweel 2 to establish the layer 20 of molten glass on the bath, which layer advances along the bath through the inlet 18. Temperature regulators 29 in the bath and temperature regulators 30 in the headspace over the bath at the inlet end of the bath ensure that the layer 20 of molten glass is advanced under thermal conditions which permit the molten glass to flow laterally unhindered to the limit of its free flow to develop on the bath a buoyant body 31 of molten glass which body is then advanced in ribbon form along the bath. The buoyant body 31 is formed in a first zone of the bath defined between the inlet end wall 13 and a partition 32 extending downwardly from the roof structure 12 towards the bath surface and extending across the bath between the side walls 15. The temperature regulators 29 and 30 are mounted in this first zone of the bath and so control cooling of the molten glass 31 as it is advanced along the bath that as the glass approaches the partition 32 its viscosity approaches the upper limit of a range of viscosities in which the ribbon can be gripped and can be attenuated by tractive effort applied from the outlet end of the bath. The buoyant body 31 of molten glass is advanced under the partition 32 to a second zone of the bath which is defined between the partition 32 and a second partition 33 extending downwardly from the roof structure 12 and between the side walls 15. In this second zone of the bath temperature regulators 34 are concentrated in the bath and temperature regulators 35 are concentrated in the headspace over the bath, and these temperature regulators 34 and 35 together ensure that the viscosity of the glass as it advances through the zone between the partitions 32 and 33 is maintained in the range of viscosities in which the ribbon can be gripped by driven edge rolls which regulate the rate of advance of the ribbon along the bath and can be attenuated by the tractive effort applied to the stiffened ribbon 25 at the discharge end of the bath by the rollers 23 and 24. For example the temperature regulators control the viscosity of the glass so that the viscosity of the glass is substantially constant in the range $10^6$ to $10^8$ poises as it is advanced through the second zone. In one example the glass, e.g. normal soda-lime glass, is cooled to about 780° C. as it passes under the partition 32 and this temperature is maintained in the glass throughout its advance through the second zone. The positions of the partitions 32 and 33 are also indicated on the temperature distribution curve of FIGURE 3.

Oppositely disposed pairs of edge rolls 36 and 37 are mounted on spindles projecting through the side walls 9 of the tank structure between the partitions 32 and 33 and the marginal areas of the ribbon of glass 38 in the second zones are gripped by these edge rolls. The distance of the edge rolls 36 and 37 from the partition 32 is such that that part of the ribbon of glass extending upstream of the edge rolls 36 and 37, and which is in the above mentioned viscous state is of sufficient length to constitute a barrier to resist the transmission of tractive effort to the buoyant body 31 of molten glass. Experiments have shown that when working with normal soda-lime glass the viscosity of the glass as it passes under the partition 32 is for example of the order of $10^{6.5}$ poises and the distance of the edge rolls from the partition 32 is about 15 feet.

The annular velocity of the edge rolls 36 and 37 is regulated by regulating means 46, of known kind thereby to regulate the rate of advance of the ribbon 38 along the bath towards the partition 33. The peripheral speed of the roll surface may be different from the velocity of the glass advancing under the partition 32 towards the edge rolls, and the rate of delivery of glass to the bath is regulated in relation to the speed of the edge rolls. As will be described below, the peripheral speed of the edge rolls is related to the rate at which the stabilised ribbon 25 is discharged from the bath, so that there is a precise regulation of the acceleration of the glass and consequential attenuation of the glass downstream of the edge rolls 36 and 37.

A third zone of the bath which extends for some distance longitudinally of the bath, is defined between the partition 33 and a further partition 39 which extends downwardly from the roof structure 12 and between the side walls 15 near the outlet end of the bath. Temperature regulators 40 are immersed in the bath throughout the length of this third zone and temperature regulators 41 are similarly mounted in the headspace over the bath. These temperature regulators 40 and 41 ensure that the ribbon 43 as it is advanced through the third zone is maintained at a constant viscosity or substantially so, in said range of viscosities in which the ribbon can be attenuated.

The distance from the edge rolls 36, 37 to the downstream partition 39 of the third zone of the bath, for example about 90 feet in the above mentioned example in which normal soda-lime glass is employed, is sufficient to ensure that the ribbon of glass 43 is attenuated to the desired thickness by the tractive effort applied to the glass by the rollers 23 and 24, which tractive effort accelerates the glass as it advances along the bath downstream of the edge rolls.

Between the end of the third zone and the outlet from the bath the temperature of the glass is regulated by temperature regulators 44 and 45 respectively in the headspace and in the bath in the vicinity of the outlet end of the bath, so that when the ribbon of glass has reached the desired thickness its viscosity is such as to arrest any further dimensional change in the ribbon under the particular set tractive effort being applied to the glass by the rollers 23 and 24. The temperature regulators 44 and 45 at the outlet end of the bath further ensure that the stabilised ribbon of glass is sufficiently cooled to permit it to be taken up off the bath surface 11 and discharged unharmed as the stiffened ribbon 25 of desired thickness through the outlet 22 from the bath onto the conveying rollers 23.

By maintaining the ribbon of glass at a viscosity at which it can be attenuated after it has been gripped by the edge rolls 36 and 37 and for a sufficient distance down the bath, as exemplified above, a ribbon of glass of desired thickness and having a lustre of fire finish quality and freedom from distortion is produced.

By regulating the tractive effort applied by the rollers 23 and 24 in relation to the speed of the edge rolls 36 and 37 glass of various thicknesses to suit various commercial demands can be produced by the method of the invention.

The effect of gripping the viscous glass 38 after it has travelled a predetermined distance down the bath, exemplified by the distance of 15 feet between the partition 32 and edge rolls 36 and 37, is to resist the transmission of tractive effort to the molten buoyant body of glass 31.

The distance of the edge rolls 36 and 37 from the partition 32 is substantially independent of the viscosity at which the glass enters the second zone. For example if the viscosity is greater than the value of $10^{6.5}$ poises mentioned above by way of example, greater tractive effort is required to accelerate the glass downstream of the edge rolls sufficiently to attenuate the glass to the desired thickness. However, because the viscosity of ribbon part 38 is greater the gripped ribbon of glass 38 still constitutes a sufficiently effective barrier to resist the transmission of tractive effort upstream of the edge rolls.

FIGURE 3 indicates the general form of the longitudinal temperature distribution down the bath and from this figure it will be seen that in one example of operation according to the invention, the temperature of the glass is maintained substantially constant from the partition 32 down to the partition 39.

The invention has been described above with reference to an embodiment in which a ribbon of glass is formed on the bath from molten glass delivered to the bath. Alternatively the invention may be applied to the production of a ribbon of glass of desired thickness from a formed ribbon of glass of definite thickness which is delivered on to the bath in a state in which it can be engaged by the edge rolls 36 and 37 and can be attenuated, or by delivering a relatively stiff ribbon of glass to the bath, and heating the ribbon to a state in which it can be attenuated as it is advanced along the bath towards the edge rolls.

By the method described above it is possible to produce flat glass in ribbon form which is of fire finish lustre and is free from distortions, and of various thicknesses from about 7 mm. down to about 3 mm. without undesirable loss in width of the ribbon.

I claim:

1. In a method of producing flat glass of desired thickness during which glass in ribbon form is advanced along a bath of molten metal and tractive effort is applied to the ultimate ribbon of glass of desired thickness, the steps of thermally conditioning the advancing ribbon of glass so that the viscosity of the glass is in the range of from $10^5$ to $10^8$ poises, applying a tractive forward effort to the glass in ribbon form at a point on the bath sufficiently rearwardly of the point of application of the first-mentioned tractive effort and of less tractive thrust than said first-mentioned tractive effort to permit attenuation of the ribbon while within said viscosity range, continuing the advance of the ribbon of glass with the edges of the ribbon unconstrained on the bath, and thermally regulating the advancing glass to maintain the viscosity of the ribbon in said range of viscosities over a sufficient length of the ribbon to ensure that the unconstrained ribbon is progressively attenuated during its travel along the bath to said desired thickness without undesirable loss of width by said tractive effort applied to the ultimate ribbon.

2. A method according to claim 1, characterised by maintaining a substantial length of the ribbon at a substantially constant viscosity in said range of viscosities throughout a gradual and progressive attenuation.

3. A method according to claim 1, characterised by engaging the glass in ribbon form marginally to regulate the rate of advance of the ribbon.

4. In a method of producing flat glass during which glass in ribbon form is advanced along a bath of molten metal, the steps of delivering glass at a controlled rate to the bath of molten metal and advancing the glass along the bath under thermal conditions which assure that a layer of molten glass is established on the bath, maintaining said glass layer in molten condition until there is developed on the surface of the bath a buoyant body of molten glass by permitting said layer of molten glass to flow laterally unhindered to the limit of its free flow, gradually cooling the molten glass as it is advanced in ribbon form to a viscosity in the range of from $10^5$ to $10^8$ poises engaging the advancing ribbon of glass marginally and applying a tractive forward effort to the ribbon while at said viscosity to regulate the rate of advance of the ribbon downstream of the bath in relation to said controlled rate of delivery of glass to the bath to attenuate the ribbon, continuing the advance of the ribbon of glass with the edges of the ribbon unconstrained on the bath, and thermally regulating the advancing glass to maintain the ribbon as it is advanced at a substantially constant viscosity in said range of viscosities over a substantial length of the ribbon on the bath to ensure that the unconstrained ribbon is gradually and progressively attenuated during its travel on the bath to a desired thickness without undesirable loss in width by tractive effort to the ribbon applied to the ultimate ribbon produced.

5. A method according to claim 2 characterised by engaging the ribbon marginally when the ribbon has advanced along the bath for a distance at said substantially constant viscosity in said range of viscosities in which the ribbon can be attenuated, which distance is such that the part of the ribbon at said viscosity upstream of the edge rolls constitutes a barrier to resist the transmission of tractive effort.

References Cited

UNITED STATES PATENTS 3,222,154  12/1965  Pilkington _____ 65—91

DONALL H. SYLVESTER, *Primary Examiner.*

A. D. KELLOGG, *Assistant Examiner.*